(12) United States Patent
Mieda

(10) Patent No.: US 6,419,065 B1
(45) Date of Patent: Jul. 16, 2002

(54) MULTI-DISK CLUTCH AND METHOD OF MANUFACTURING A CORE PLATE OF A MULTI-DISK CLUTCH

(75) Inventor: Kenji Mieda, Hirakata (JP)

(73) Assignee: Exedy Corporation, Osaka (JP)

( * ) Notice: Subject to any disclaimer, the term of this patent is extended or adjusted under 35 U.S.C. 154(b) by 22 days.

(21) Appl. No.: 09/612,983

(22) Filed: Jul. 10, 2000

(30) Foreign Application Priority Data

Jul. 19, 1999 (JP) .......................................... 11-205243

(51) Int. Cl.[7] .......................................... F16D 25/063
(52) U.S. Cl. .................. 192/70.2; 192/85 AA; 192/87.11
(58) Field of Search ............................ 192/70.2, 70.19, 192/70.27, 85 AA, 87.11

(56) References Cited

U.S. PATENT DOCUMENTS 2,481,834 A * 9/1949 Foster ........................ 192/70.2
3,494,452 A * 2/1970 Finkin ...................... 192/70.14

FOREIGN PATENT DOCUMENTS

JP 10-252777 A 9/1998

* cited by examiner

*Primary Examiner*—Saul Rodriguez
(74) *Attorney, Agent, or Firm*—Shinjyu Global IP Counselors, LLP

(57) ABSTRACT

A multi-disk clutch 6 is provided with a reduced thickness so that the size of devices, such as a transmission employing the multi-disk clutch 6 can also be reduced. The multi-disk clutch 6 is configured to transmit and interrupt a torque between a radially outer wall 52 and a second cylindrical portion 69 of a spline hub. The multi-disk clutch 6 includes a plurality of first friction plates 50 and a plurality of second friction plates 51. Radially outer portions of the first friction plates 50 are coupled in a circumferential direction to the radially outer wall 52. Each second friction plate 51 has a core plate 90 and a friction facing 51*a*. The core plate 90 has a friction mounting portion opposed to the first friction plate 50, and tooth portions. The tooth portions are in mesh with the second cylindrical portion 69 of the spline hub. The friction facing 51*a* is joined to the friction mounting portion. The friction mounting portion has a smaller thickness than the tooth portion.

29 Claims, 12 Drawing Sheets

MULTI-DISK CLUTCH AND METHOD OF MANUFACTURING A CORE PLATE OF A MULTI-DISK CLUTCH

BACKGROUND OF THE INVENTION

1. Field of the Invention

This invention generally relates to a multi-disk clutch used in a transmission of a vehicle or the like. More specifically, the present invention relates to a multi-disk clutch provided with a core plate to which a friction member is joined.

2. Background Information

Generally, a multi-disk clutch is typically used in an automatic transmission of a vehicle or the like. The multi-disk clutch is usually provided with a plurality of input friction plates and a plurality of output friction plates. The input and output friction plates are alternately arranged relative to each other. The multi-disk clutch is also provided with input and output cylindrical members, which are arranged radially inside and outside the input and output friction plates, respectively. Each of the input and output friction members is provided at its inner or outer periphery with teeth, which are axially movably engaged with grooves formed on the cylindrical member located radially inside or outside the friction plate.

A transmission provided with the multi-disk clutch of the above type is disclosed in Japanese Laid-Open Patent Publication No. 10-252777. As seen in FIG. 12 of this application, a partial cross-sectional view of a multi-disk clutch 6 is illustrated corresponding to the multi-disk disclosed in the aforementioned publication. The transmission disclosed therein is provided with a pair of multi-disk clutches with only the second multi-disk clutch 6 being shown in FIG. 12.

The prior art multi-disk clutch 6 forms a brake, which is provided with two kinds of friction plates, i.e., three first friction plates 50 and two second friction plates 51 disposed alternately thereto. Each first friction plate 50 has radially outer teeth, which are engaged to move in an axial direction (i.e., movably in a direction of an axis O—O) but non-rotatably coupled with grooves formed on an inner periphery of a radially outer cylindrical wall 52. Each second friction plate 51 has radially inner teeth. The teeth of the second friction plates 51 are engaged with grooves that are formed on an outer periphery of a cylindrical portion 69 of a spline hub. This is done so that the second friction plate 51 moves in an axial direction (i.e., movably along the axis O—O) but is non-rotatably coupled to the cylindrical portion 69 of the spline hub. stop plate 53 is arranged to support a surface of the first friction plate 50 on the right end that is remote from the second friction plate 51. The stop plate 53 has a radially outer portion, which is fitted and fixedly coupled to a groove formed on the inner periphery of the radially outer wall 52. A piston plate 55 is opposed to a surface of the first friction plate 50 on the left end that is remote from the second friction plate 51. The piston plate 55 is slidably engaged with grooves on the inner periphery of the radially outer wall 52. In this structure, the multi-disk clutch 6 is engaged when the piston plate 55 is hydraulically moved rightward, and is disengaged when the piston plate 55 moves leftward.

In a conventional multi-disk clutch, a core plate to which a friction member is joined has a relatively large thickness, as can be demonstrated by the aforementioned multi-disk clutch 6 disclosed in the above-mentioned publication. For example, in the multi-disk clutch 6 shown in FIG. 12, a core plate 51b supporting friction members 51a joined thereto has a thickness in a range from about 1.0 mm to about 1.5 mm. This is because the radially inner teeth of the second friction plate 51 (i.e., the radially inner teeth of the core plate 51b) mesh with the grooves on the cylindrical portion 69. Thus, the teeth must have a tooth surface equal to or greater than a predetermined area to ensure a sufficient torque transmission capacity. In other words, the thickness of the core plate 51b is determined based on the area of the tooth surface required for the torque transmission.

However, it is also desirable to reduce the overall thickness (L1 shown in FIG. 12) of the multi-disk clutch, so that the size of the transmission can be reduced. This allows the transmission to be installed in an area where the available space is limited.

In view of the above, there exists a need for multi-disk clutch and method of manufacturing a core plate of a multi-disk clutch which overcomes the above mentioned problems in the prior art. This invention addresses this need in the prior art as well as other needs, which will become apparent to those skilled in the art from this disclosure.

SUMMARY OF THE INVENTION

An object of the invention is to reduce the thickness of a multi-disk clutch, and thereby reduce the size of a device such as a transmission provided with the multi-disk clutch.

According to one aspect of the present invention, a multi-disk clutch for transmitting and interrupting a torque between first and second members includes a plurality of first plates and a plurality of second plates. Each of the first plates is circumferentially coupled to the first member. Each of the second plates has a core plate and a friction member. The core plate has a friction mounting portion and a coupling portion. The friction mounting portion is opposed to the first plate. The coupling portion is circumferentially coupled to the second member. The friction member is joined to the friction mounting portion of the core plate. The friction mounting portion of the core plate has a thickness smaller than a thickness of the coupling portion of the core plate.

According to the multi-disk clutch of the above aspect of the present invention, the friction member which is joined to the friction mounting portion of the core plate is opposed to the first plate. When the friction member is pressed to the first plate, the multi-disk clutch enters the coupled state to transmit the torque between the first and second members. When a force for the above pressing is released, the multi-disk clutch assumes the released state to interrupt the torque transmission between the first and second members.

In the above aspect of the present invention, the coupling portion of the core plate reliably has a thickness required for the intended torque transmission. Further, the friction mounting portion of the core plate joined to the friction member has a smaller thickness than the coupling portion. More specifically, the multi-disk clutch is configured to suppress an increase in thickness of the friction mounting portion, while maintaining a large thickness for the coupling portion, which is not joined to the friction member. The friction mounting portion supports the friction member joined thereto and is liable to increase the whole thickness of the multi-disk clutch. Thereby, the same torque transmission capacity as that in the prior art can be ensured. Further, the portion (i.e., friction mounting portion) of the core plate joined to the friction member has a smaller thickness than in the prior art. Therefore, the thickness of the multi-disk clutch is reduced as a whole, and a device employing this multi-disk clutch can be reduced in size.

According to the another aspect of the present invention, the multi-disk clutch of the previous aspect of the present invention has a feature such that the coupling portion of the core plate and the second member mesh teeth for coupling the coupling portion of the core plate to the second member. In this aspect of the present invention, the coupling portion of the core plate and the second member are coupled via the meshing structure. The core plate has the friction mounting portion with small thickness as well as the coupling portion with large thickness. Thus, teeth meshing with the second member can reliably have a sufficiently large tooth surface area, and a sufficient torque transmission capacity can be ensured.

According to another aspect of the present invention, the multi-disk clutch of any of the previous aspects of the present invention, further has a feature such that the coupling portion of the core plate and the second member are coupled together via an internally-toothed wheel. In this aspect of the present invention, a toothed wheel provided with external teeth and the internally-toothed wheel provided with internal teeth mesh with each other for transmitting the torque between the coupling portion of the core plate and the second member. Although the friction mounting portion of the core plate has the smaller thickness, the coupling portion of the core plate has the larger thickness. Thus, the teeth of the coupling portion meshing with the second member can reliably have a sufficiently large area.

According to another aspect of the present invention, the multi-disk clutch of one of the last two mentioned aspects of the present invention further has a feature such that at least the tooth surface portion in the coupling portion of the core plate for contact with the tooth of the second member has a larger thickness than the friction mounting portion of the core plate. In this aspect of the present invention, the tooth surface portion in the coupling portion has a thickness larger than that of the friction mounting portion. The tooth surface portion can come into contact with the second member. Thereby, the area of the tooth surface required for the torque transmission is ensured while suppressing a need for an increase in overall thickness of the multi-disk clutch.

According to another aspect of the present invention, the multi-disk clutch of any one of the first three mentioned aspects of the present invention, further has a feature such that the coupling portion of the core plate projects externally beyond one side surface of the friction mounting portion of the core plate. This provides an L-shaped section of the core plate. In this aspect of the present invention, since the core plate has the L-shaped section, the core plate can be easily formed, e.g., by press work.

According to another aspect of the present invention, the multi-disk clutch of any one of the first three mentioned aspects of the present invention, further has a feature such that the friction members are joined to the opposite side surfaces of the friction mounting portion of the core plate. The coupling portion of the core plate projects externally beyond the opposite side surfaces of the friction mounting portion so that the core plate has a T-shaped section. In this aspect of the present invention, since the core plate has the T-shaped section, required thickness of the coupling portion of the core plate can be ensured more easily than in the case of the L-shaped section.

According to another aspect of the present invention, a method of manufacturing a core plate having an integral structure of the multi-disk clutch of any one of the previous aspects of the present invention, includes a first step and a second step. In the first step, a material member having a thickness equal to that of the friction mounting portion, and having a larger area than that of the plane area of the core plate of a final configuration is prepared. In the second step, a force is applied to the material prepared in the first step in a direction crossing the direction of its thickness, and thereby increasing the thickness of a portion forming the coupling portion. In this aspect of the present invention, the second step is executed on the plate-shaped material having the uniform thickness for increasing the thickness of the coupling portion. For example, pressing is effected to apply the force in the direction, which is substantially perpendicular to the direction of the thickness of the material, while pushing the end surface and/or upper and lower surfaces of the material. Thereby, the core plate of an integral structure, in which the coupling portion has the increased thickness, can be formed from the plate-shaped material.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
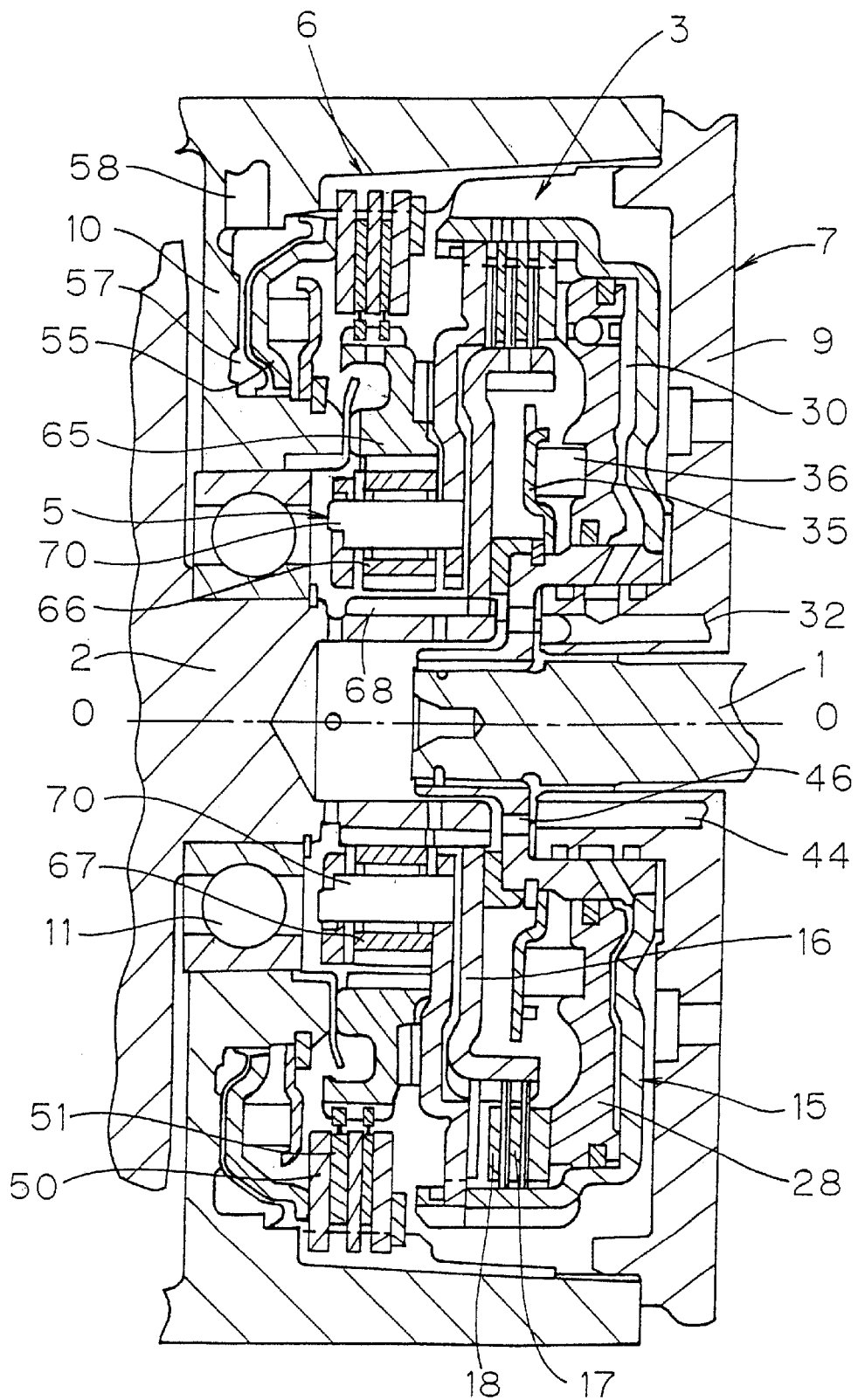
FIG. 1 is a cross-sectional view of a transmission including a pair of multi-disk clutches according to an embodiment of the invention.

Referring initially to FIG. 1, a cross-sectional view of a transmission employing a multi-disk clutch in accordance with one embodiment of the present invention is illustrated. The transmission shown in FIG. 1 is hydraulically controlled to transmit a torque from an input shaft 1 to an output shaft 2 at different speeds. The transmission has a rotation axis O—O that is coaxial with the input and output shafts 1 and 2. A first multi-disk clutch 3 is disposed radially outside the input shaft 1. A planetary gear mechanism 5 is disposed radially outside the output shaft 2. A second multi-disk clutch 6 is disposed radially outside the planetary gear mechanism 5.

The multi-disk clutches 3 and 6 as well as the planetary gear mechanism 5 are disposed inside the housing assembly 7. The input shaft 1 extends through an aperture in one end wall 9 of the housing assembly 7 to a position outside the housing assembly 7. The output shaft 2 extends through a bearing aperture in another end wall 10 of the housing assembly 7 to a position outside the assembly 7. The output shaft 2 is supported within the bearing aperture via a bearing 11.

Figure 2:
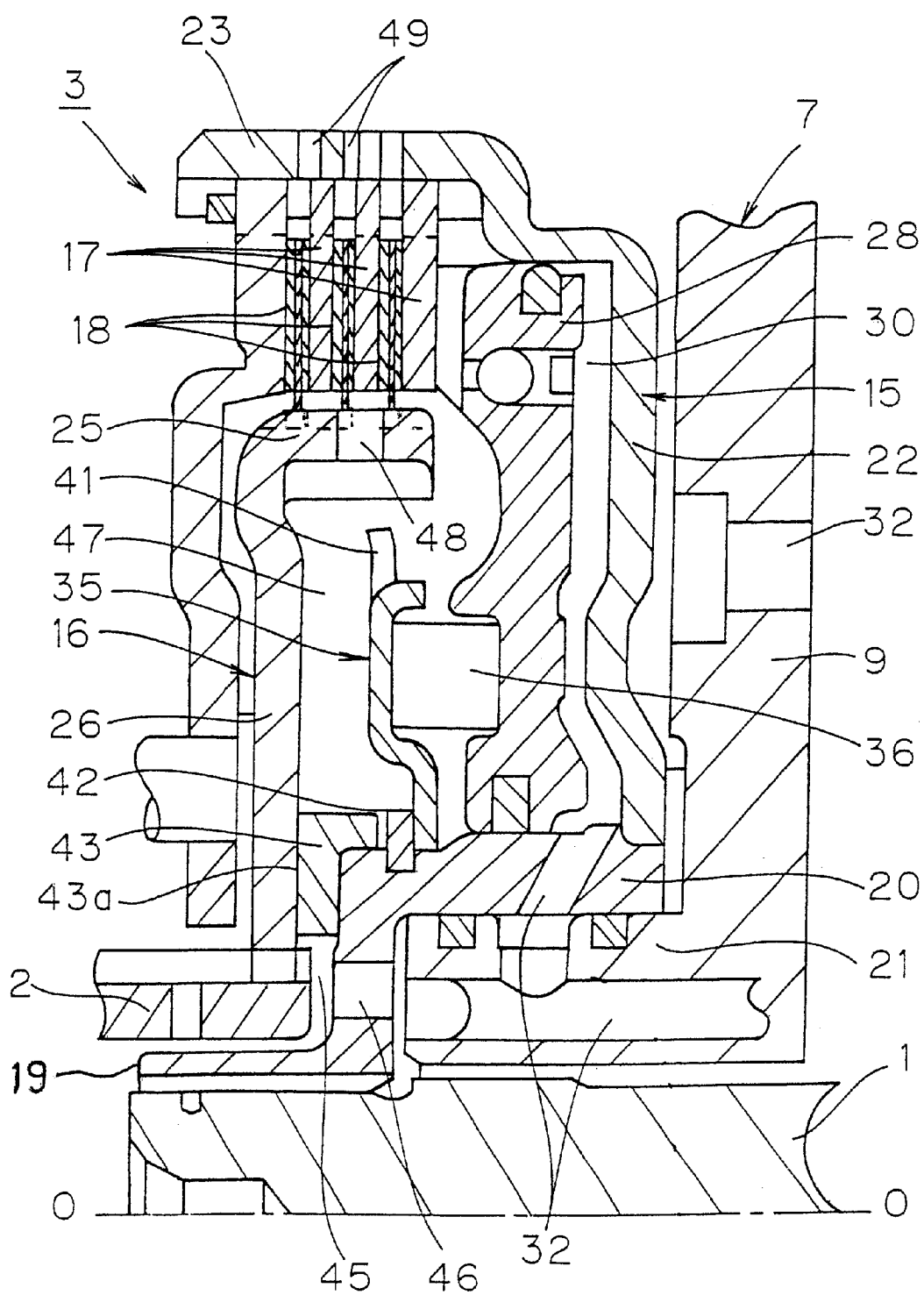
FIG. 2 is a partial cross-sectional view of the transmission showing on an enlarged scale a portion of one of the multi-disk clutches illustrated in FIG. 1.

Referring now to FIG. 2, a fragmentary view of the transmission is illustrated, on an enlarged scale to show more details of the multi-disk clutch 3 shown in FIG. 1. Referring to FIG. 2, the multi-disk clutch 3 includes an input assembly 15, an output member 16, a plurality of first friction plates 17 on the input side and a plurality of second friction plates 18 on the output side.

The input assembly 15 has an inner peripheral portion 19, an inner cylindrical portion 20, an annular portion 22 and a first outer cylindrical portion 23. The inner peripheral portion 19 is fixed to the outer periphery of the input shaft 1 via a spline. The inner cylindrical portion 20 is rotatably supported around an outer peripheral surface of a cylindrical portion 21 projected from the end wall 9 with oil seals therebetween. An outer peripheral portion of an end of the inner cylindrical portion 20, which neighbors the end wall 9, is fixedly coupled to an inner peripheral portion of the annular portion 22 of the input assembly 15. The annular portion 22 extends substantially in a radial direction from the inner cylindrical portion 20. The annular portion 22 has a radially outer end with the first outer cylindrical portion 23 being integrally formed therewith. The first outer cylindrical portion 23 extends axially away from the end wall 9.

The first and second friction plates 17 and 18 on the input and output sides are located radially inside of the first outer cylindrical portion 23. The first and second friction plates 17 and 18 are located alternately in the axial direction of the axis O—O relative to each other. Each first friction plate 17 on the input side is provided at its outer periphery with teeth. The teeth of the first friction plates 17 are engaged with grooves that extend in the axial direction of the axis O—O on the inner periphery of the first outer cylindrical portion 23. Thereby, the first friction plate 17 are axially (i.e., in the direction of the axis O—O) movable relative to the first outer cylindrical portion 23, but non-rotatably coupled to the first outer cylindrical portion 23.

The output member 16 is provided at its radially outer portion with a second outer cylindrical portion 25 as shown in FIG. 2. Grooves are formed on the outer periphery of the second cylindrical portion 25 that are engaged with teeth formed on the inner periphery of the second friction plates 18. Thus, the second friction plates 18 are axially (i.e., in the direction of the axis O—O) movable relative to the output member 16, but non-rotatably coupled to the output member 16. The specific structure of each second friction plate 18 is the same as that of the second friction plates 51 (shown in FIG. 3) of the multi-disk clutch 6, which will be described later. Still referring to FIG. 2, the output member 16 is further provided with an annular portion 26 that extends radially inward from the end of the second cylindrical portion 25 remote from the end wall 9. The inner periphery of the annular portion 26 is coupled to the outer periphery of the end portion of the output shaft 2 through a spline.

A piston or pressure plate 28 is disposed between the annular portion 22 of the input assembly 15 and the output member 16. The radially outer portion of the pressure plate 28 is opposed to the first friction plate 17 adjacent thereto. The outer periphery of the pressure plate 28 is slidably engaged with the inner peripheral surface of the cylindrical portion 23 of the input assembly 15 with an oil seal therebetween. The inner peripheral surface of the pressure plate 28 is slidably engaged with the outer peripheral surface of the cylindrical portion 20 of the input assembly 15 with an oil seal therebetween. A working fluid chamber 30 is formed between the pressure plate 28 and the input assembly 15. The working fluid chamber 30 is connected to a hydraulic controller mechanism in an external position via an oil passage 32 formed in the end wall 9 and other passages (not shown).

A spring retainer 35 is disposed between the pressure plate 28 and the annular portion 26 of the output member 16. The spring retainer 35 has guides 41, that are formed of an annular plate which extends substantially in the radial direction. A return spring 36 is disposed between the spring retainer 35 and the pressure plate 28. Although not shown clearly, the return spring 36 is formed of a plate spring having a circumferential section of a wavy form, and extends in a spiral fashion around the cylindrical portion 20 as a whole. Accordingly, the return spring 36 is supported by the spring retainer 35, and biases the pressure plate 28 away from the first friction plate 17.

As shown in FIG. 2, the inner periphery of the spring retainer 35 is supported by a snap ring 42. The snap ring 42 is fixedly coupled to the outer periphery of the cylindrical portion 20. The snap ring 42 supports a side of the spring retainer 35 remote from the pressure plate 28. A thrust bearing 43 is disposed between the inner periphery of the output member 16 and the end of the cylindrical portion 20 opposed thereto.

An annular space 45 is formed radially inside the thrust bearing 43. The radial portion between the inner peripheral portion 19 and the cylindrical portion 20 is provided with a passage 46 in communication with the annular space 45. The cylindrical portion 21 of the housing assembly 7 is provided with a passage 44 in communication with the passage 46 as shown in FIG. 1, in addition to the working fluid passage 32 already described and shown in FIG. 2.

Referring to FIG. 2, the thrust bearing 43 is provided at its surface, which is in contact with the output member 16, with a plurality of radial grooves 43a (passages) each having open opposite ends. The grooves 43a connect a radially outer space 47 to the annular space 45. Furthermore, the output member 16 is provided with a plurality of oil apertures 48, which are circumferentially spaced from each other. Each oil aperture 48 extends between the inner and outer peripheries of the second cylindrical portion 25. Each guide 41 of the spring retainer 35 is located such that the surface thereof opposed to the space 47 is radially aligned to the edges of the oil apertures 48 near the pressure plate 28. This configuration is made although the guides 41 are circumferentially equally spaced from each other, and are located in the aligned positions radially inside the oil apertures 48.

Figure 3:
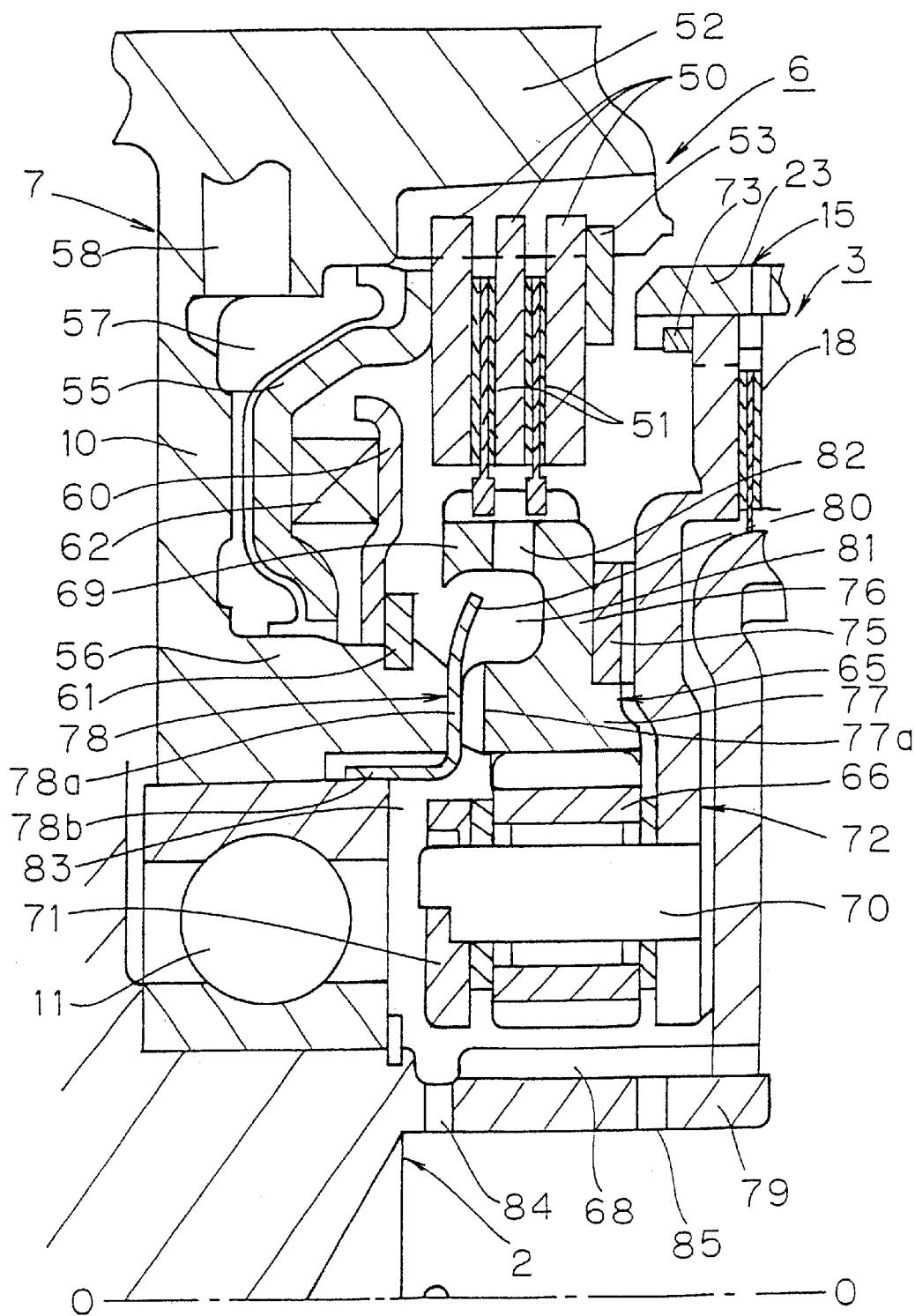
FIG. 3 is a partial cross-sectional view of the transmission showing on an enlarged scale a portion of the other multi-disk clutch shown in FIG. 1.

Referring to FIG. 3, the planetary gear mechanism 5 and the multi-disk clutch 6 will now be briefly described. The multi-disk clutch 6 forms a brake that includes two kinds of friction plates, i.e., a plurality (three) of fixed first friction plates 50 and a plurality (two) of movable second friction plates 51 which are interposed between the first friction plates 50. The friction plates 50 and 51 are continuous annular ring-shaped members. Each first friction plate 50 has radially outer teeth. The radially outer teeth of the first friction plates 50 engage the grooves formed on the inner peripheral surface of the radially located outer wall 52 of the housing assembly 7 so that the first friction plates 50 are axially (i.e., in the direction of the axis O—O) movable. However, the first friction plates 50 are non-rotatably engaged with the grooves formed on the inner periphery of the radially outer wall 52 of the housing assembly 7.

A stop plate 53 preferably supports the first friction plate 50 that is the farthest 10 from the end wall 10. More specifically, the stop plate 53 supports the surface thereof remote from the second friction plate 51. The stop plate 53 has an outer periphery which is fixedly fitted to the grooves formed on the inner periphery of the radially outer wall 52.

The radially outer portion of the piston plate 55 is opposed to the one of the first friction plates 50 that is nearest to the end wall 10. More specifically, the radially outer portion of the piston plate 55 is opposed to the surface thereof remote from the second friction plate 51. The outer periphery of the piston plate 55 is slidably engaged with the inner periphery of the radially outer wall 52. The inner periphery of the piston plate 55 is slidably fitted to the outer periphery of a cylindrical portion 56 which projects integrally from the end wall 10. A working fluid chamber 57 is formed between the end wall 10 and the piston plate 55. The working fluid chamber 57 is connected to a hydraulic controller mechanism (not shown) via a passage 58 formed in the outer wall 52 and others.

An annular spring retainer 60 is fixedly coupled by a snap ring 61 to the outer periphery of the portion of the cylindrical portion 56 projected beyond the piston plate 55. A return spring 62 is disposed between the snap ring 61 and the piston plate 55. The return spring 62 has a structure similar to that of the return spring 36 shown in FIG. 2.

Referring again to FIG. 1, the planetary gear mechanism 5 includes a spline hub 65 forming a ring gear, two kinds of pinions 66 and 67, and a sun gear 68. The spline hub 65 also serves as a component of the multi-disk clutch 3. Referring now to FIG. 3, the spline hub 65 is provided at its radially outer portion with a second cylindrical portion 69. The inner teeth of the second friction plates 51 are engaged with grooves formed on the outer periphery of the second cylindrical portion 69. Thus, each second friction plate 51 is coupled to the spline hub 65 for axial (i.e., in the direction of the axis O—O) movement, but is also non-rotatably coupled to the spline hub 65. The specific structure of the second friction plates 51 will be described later.

The sun gear 68 is formed of a cylindrical portion 79 formed on the end of the output shaft 2. Referring now to FIG. 1, the pinions 66 and 67 are arranged in circumferentially alternate positions within an annular space between the spline hub 65 and the sun gear 68, respectively. The pinions 66 are in mesh with the inner teeth of the spline hub 65, i.e., the ring gear. The other pinions 67 are in mesh with the outer teeth of the sun gear 68.

The pinions 66 and 67 are supported on pinion shafts 70 parallel to the input shaft 1 via bearings, respectively. As seen in FIG. 3, each pinion shaft 70 has opposing ends fixed to annular supports 71 and 72, respectively. A pinion assembly is formed of pinions 66 and 67 (shown in FIG. 1) as well as the supports 71 and 72 (shown in FIG. 3). The support 71 is formed of an annular plate having a relatively small radial width. The support 72 has a larger outer diameter than that of the support 71, and has the following structure.

The radially outer portion of the support 72 is in contact with the second friction plate 18 of the multi-disk clutch 3 on the side nearest to the end wall 10. The support 72 is provided at its outer periphery with teeth engaged with axial grooves (i.e; grooves parallel to the axis O—O) on the inner periphery of the first cylindrical portion 23. A snap ring 73 is fixed to the inner periphery of the end of the first cylindrical portion 23 for preventing the support 72 from moving away from the second friction plate 18.

The radially middle portion of the support 72 is in axial contact with a radially middle portion 76 of the spline hub 65 via a thrust bearing 75.

The spline hub 65 is provided at its inner periphery with a cylindrical portion 77. An end surface of the cylindrical portion 77 remote from the support 72 is in contact with the end surface of the cylindrical portion 56 of the housing assembly 7 via a thrust washer 78.

The thrust washer 78 includes a support portion 78a and an annular extension which projects outward from the support portion 78a to form a guide 80. The support portion 78a extends radially through a space between the cylindrical inner peripheral portion 77 and the cylindrical portion 56. The guide 80 and the middle portion 76 of the spline hub 65 define an annular space 81 therebetween. The guide 80 is slightly inclined so that its radially outer portion is shifted toward ends of oil apertures 82, which will be described later, near the end wall 10. The support portion 78a is provided at its inner periphery with a cylindrical portion 78b extending away from the spline hub 65. The cylindrical portion 78b is in contact with an outer peripheral surface of the outer race of the bearing 11.

The oil apertures 82 are formed in the second cylindrical portion 69 of the spline hub 65 surrounding the outer periphery of the space 81. More specifically, the oil apertures 82 are formed in the circumferentially spaced positions, and radially connect the axial grooves on the outer periphery of the second cylindrical portion 69 to the space 81. The radially inner portion 77 of the spline hub 65 is provided at its end surface with a plurality of grooves 77a (oil passages) connecting its radially inner space 83 to the space 81. The space 83 is in communication with the foregoing passages 46 (FIG. 1) via oil passages 84 and 85, a radially inner gap and others, as seen in FIG. 3. The oil passages 84 and 85 are formed in the cylindrical portion 79 of the output shaft 2.

The operations of the transmission of the embodiment will now be described. As seen in FIG. 1, when the working fluid chamber 30 is pressurized by the working fluid supplied thereto from the passage 32, the pressure plate 28 presses the first and second friction plates 17 and 18 together. Thus, the multi-disk clutch 3 is engaged. In this state, the torque supplied from the input shaft 1 to the input assembly 15 is transmitted to the output member 16 via the first and second friction plates 17 and 18. The torque is further transmitted from the output member 16 to the output shaft 2.

When the pressure in the working fluid chamber 30 is released, the return spring 36 pushes the pressure plate 28 toward the end wall 9. Thus, the first and second friction plates 17 and 18 are released from the pressed state, and the multi-disk clutch 3 is disengaged. In this state, the torque supplied from the input shaft 1 to the input assembly 15 is transmitted via the first cylindrical portion 23 of the input assembly 15 to the support 72 shown in FIG. 3.

In the multi-disk clutch 6 shown in FIG. 3, the working fluid chamber 57 is pressurized by the working fluid so that the piston plate 55 presses the first and friction plates 50 and 51 together. When the multi-disk clutch 6 is engaged in this manner, the spline hub 65 is fixedly coupled to the radially outer wall 52. The pinion assembly rotates together with the input assembly 15. Thus, the torque of the input assembly 15 is transmitted from the support 72 to the output shaft 2 via the pinions 66 and 67 as shown in FIG. 1.

Referring to FIG. 2, in the above operation, the lubricating oil is supplied to the annular space 45 through the passage 44 shown in FIG. 1 and the passage 46 shown in FIG. 2. This lubricating oil is forced by centrifugal force to flow into the space 47 through the grooves 43a between the thrust bearing 43 and the output member 16. The lubricating oil then reaches the inner periphery of the second cylindrical portion 25, and flows through the passages 48 to the surfaces of the first and second friction plates 17 and 18. Thereby, the surfaces of the first and second friction plates 17 and 18 are prevented from excessive heating and abnormal wearing.

The lubricating oil flowing on the surfaces of the first and second friction plates 17 and 18 is then externally discharged through the oil apertures 49 outside the plates 17 and 18. In the above lubricating operation, the lubricating oil which flows radially outward in the space 47 is guided by the guides 41 of the spring retainer 35 to flow concentratedly into the oil passages 48.

In the multi-disk clutch 6 shown in FIG. 3, the first and second friction plates 50 and 51 are effectively lubricated in the following manner. Referring to FIG. 2, a part of the lubricating oil is supplied through the foregoing oil passage 46. Now referring to FIG. 3, the lubricating oil flows into the space inside the cylindrical portion 79 through the space between the end of the input shaft 1 shown in FIG. 1, and the end cylindrical portion 79 of the output shaft 2, shown in FIG. 3. A part of the oil supplied into the space flows through the oil passage 85 formed in the cylindrical portion 79 to the pinions 66 and 67 (shown in FIG. 1), and others for lubricating them.

Referring to FIG. 3, the lubricating oil inside the cylindrical portion 79 also flows to the space 83 near the bearing 11 through the passage 84 formed in the cylindrical portion 79. The lubricating oil then flows therefrom into the space 81 through the grooves 77a. The lubricating oil in the space 81 is guided by the guide 80 to flow efficiently into the oil apertures 82. The lubricating oil then flows on the surfaces of the first and second friction plates 50 and 51 to lubricate them.

Figure 4:
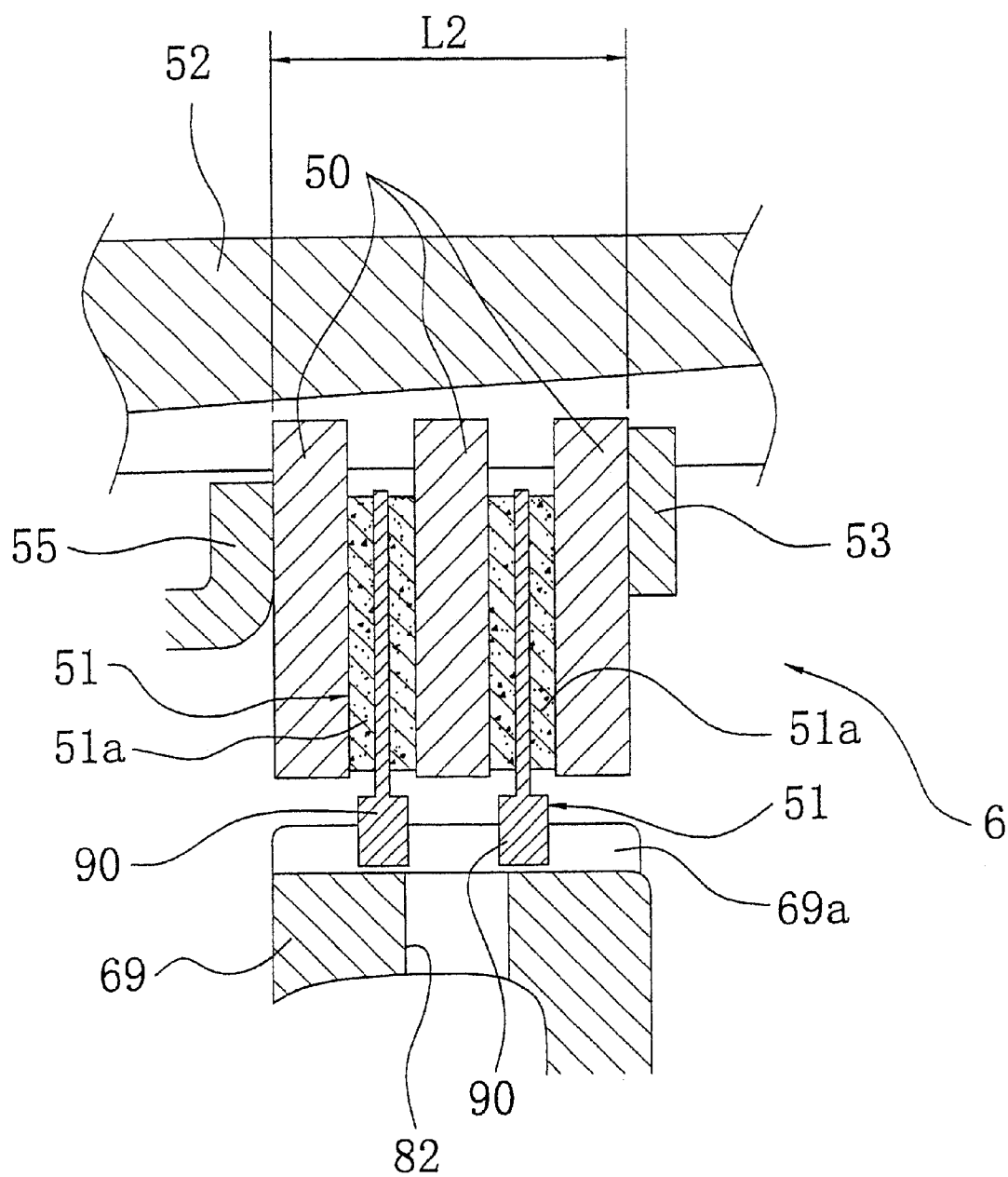
FIG. 4 is an enlarged partial cross-sectional view of the transmission showing an enlarged portion of the multi-disk clutch shown in FIGS. 1 and 3.
Figure 5:
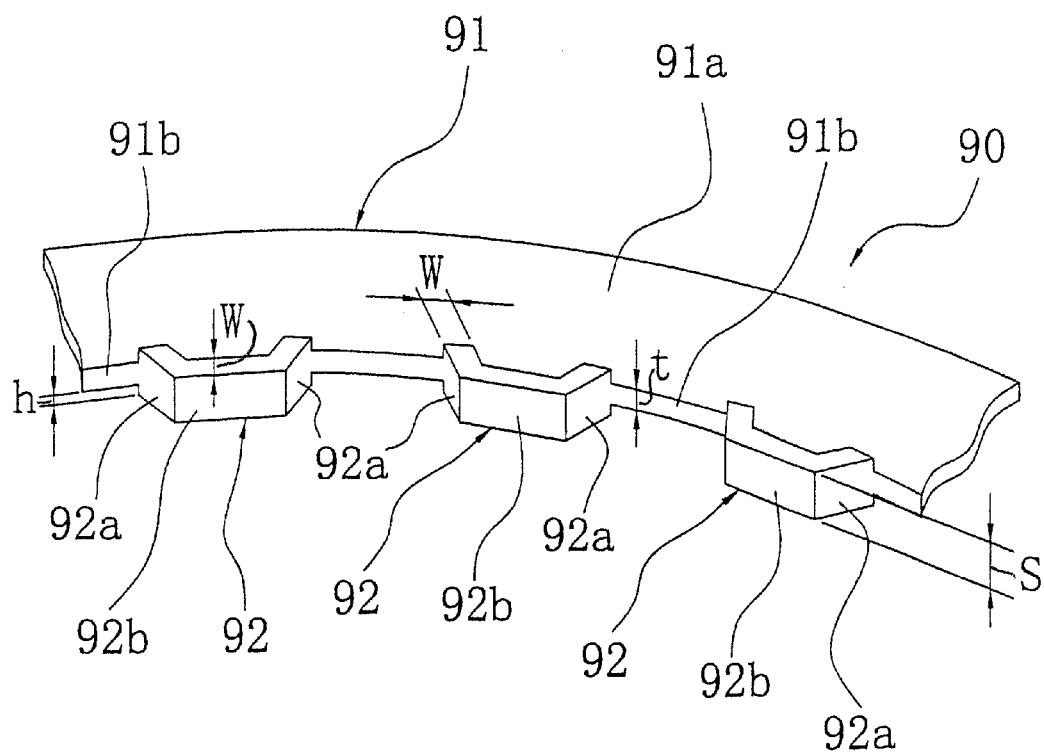
FIG. 5 is a partial perspective view of a core plate of the multi-disk shown in FIGS. 1, 3 and 4.
Figure 6:
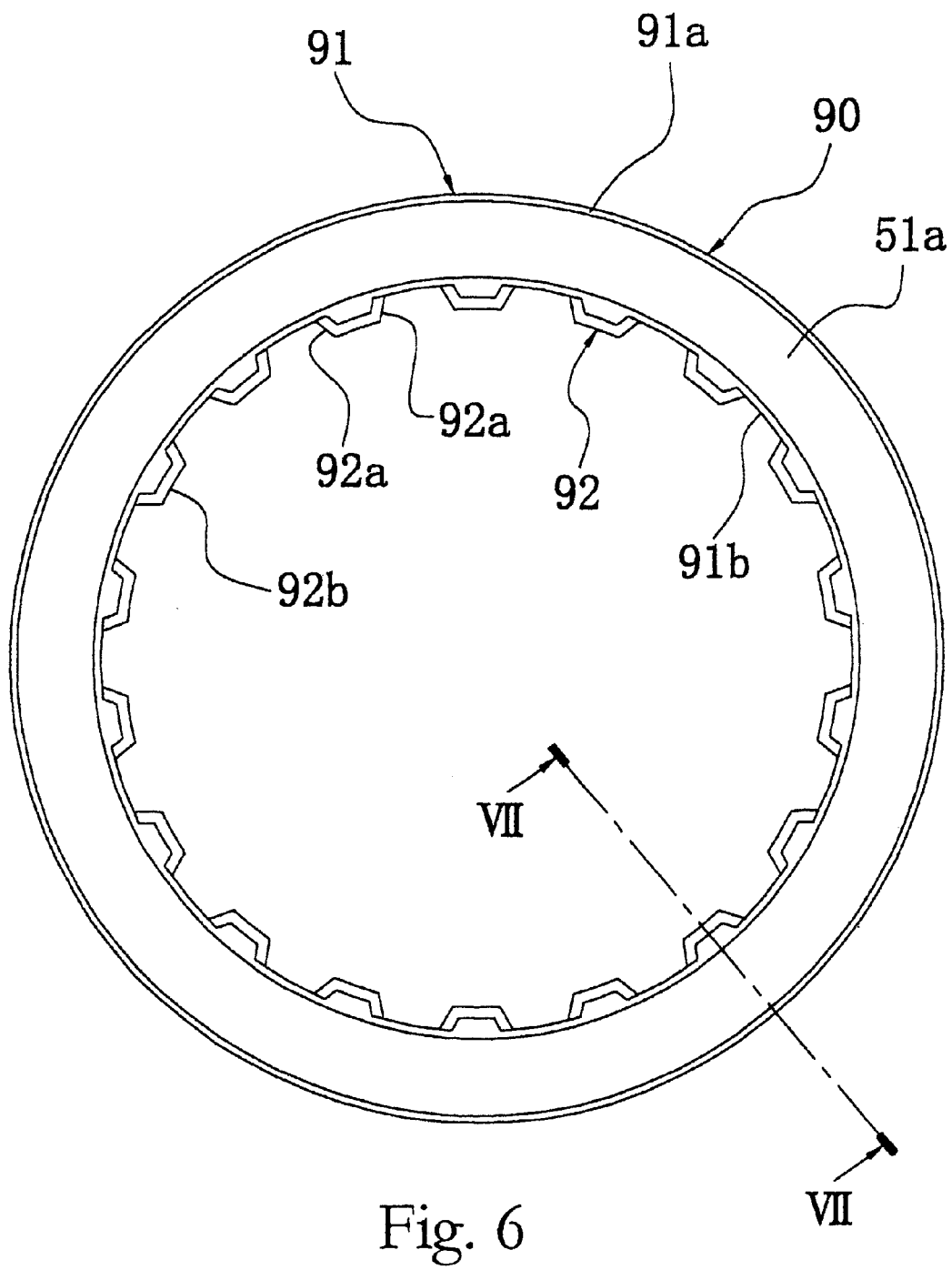
FIG. 6 is a side elevational view of the core plate illustrated in FIG. 5 with a friction facing coupled thereto so as to form the second friction plate for the multi-disk illustrated in FIGS. 1, 3 and 4.

Referring to FIGS. 4 to 7, the second friction plate 51 of the multi-disk clutch 6 will now be described in greater detail. As seen in FIG. 1, the structure of the second friction plate 18 of the multi-disk clutch 3 is similar to that of the second friction plate 51. As best seen in FIG. 4, the second friction plate 51 is primarily formed of a core plate 90 and a friction facing (friction member) 51a. The friction facing 51a can be formed of an annular member as shown in FIG. 6, or can be formed of a plurality of circumferentially arranged portions.

Referring to FIG. 5, the core plate 90 is made of a single disk-shaped member of an integral structure, as will be described later. The core plate 90 has a friction mounting portion (friction mounting portion) 91 at the radially outer portion and tooth portions (coupling portion) 92 at the radially inner portion.

The friction mounting portion 91 has opposite side surfaces, which form joining surfaces 91a for fixing friction facings 51a thereto, respectively. The friction mounting portion 91 is located in the radial position opposed to the first friction plate 50 shown in FIG. 4.

As seen in FIG. 5, the tooth portions 92 are configured to mesh with the spline grooves 69a (see FIG. 4) formed on the outer peripheral surface of the second cylindrical portion 69 of the spline hub 65. Referring again to FIG. 5, the tooth portions 92 are provided with tooth surfaces 92a and tooth top surfaces 92b. The tooth surfaces 92a are in direct contact with the spline grooves 69a shown in FIG. 4. As shown in FIG. 5, tooth top surfaces 92b each extend between radially inner edges of the tooth surfaces 92a of each tooth portion 92. The tooth surface 92a and the tooth top surface 92b have an axial length or thickness S (i.e., a size in the direction along the axis O—O), which is larger than an axial length or thickness t (i.e., a size in the direction along the axis O—O) of the friction mounting portion 91. The thickness S of the tooth surface 92a and others is substantially in a range from 150% to 200% of the thickness t of the friction mounting portion 91. The thickness S is determined to contribute effectively to the strength.

Figure 7:
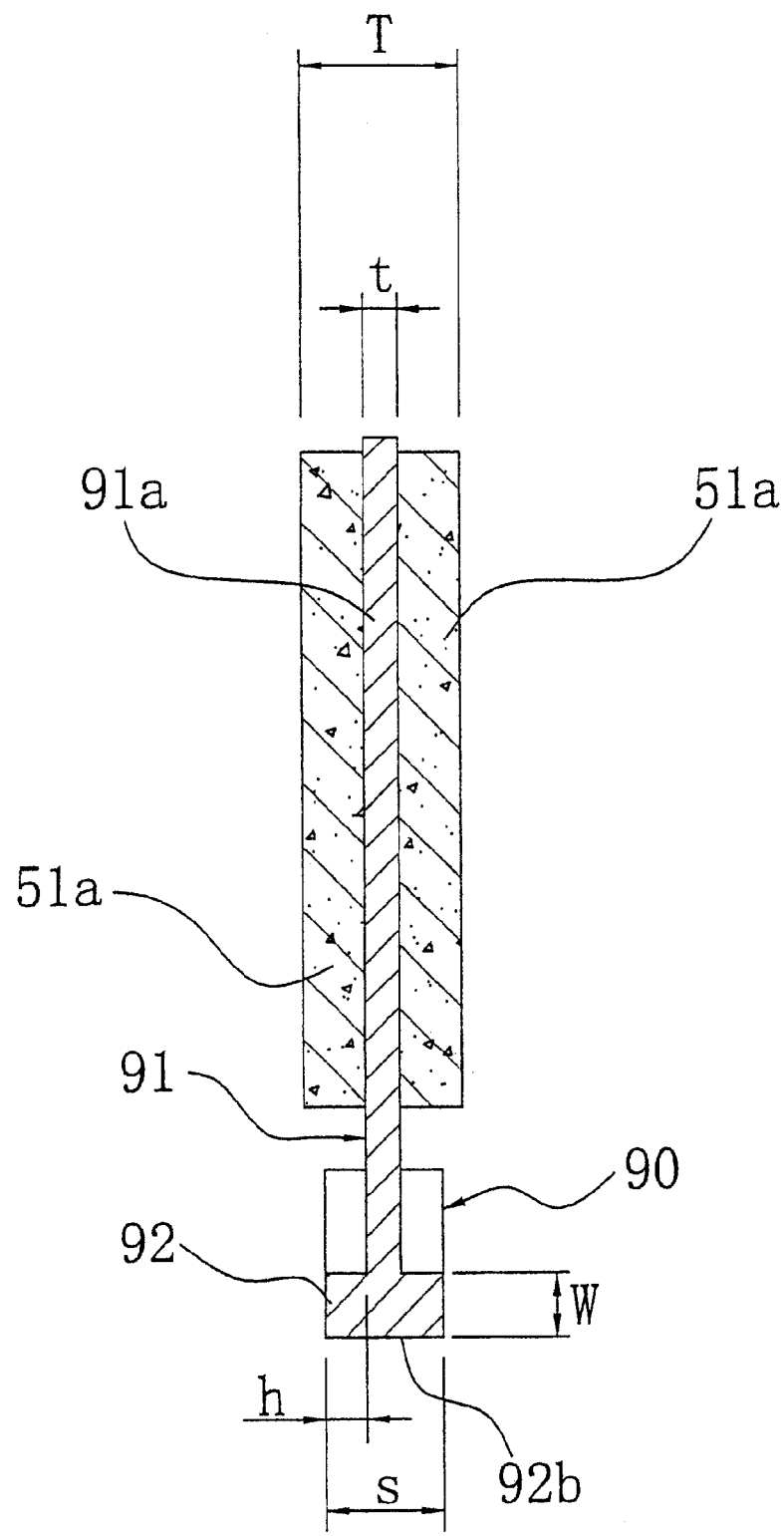
FIG. 7 is a partial cross-sectional view of the second friction plate illustrated in FIGS. 1, 3 and 4 taken along line VII—VII of FIG. 6.

The core plate 90 is formed such that the friction mounting portion 91 has the small thickness t, while the tooth portions 92 have the large thickness S. The core plate 90 has an inverted T-shaped cross-section as shown in FIGS. 4 and 7. More specifically, as seen in FIG. 5, the thickness S is preferably larger than the thickness t of the friction mounting portion 91 by (2×h) where h is an increased thickness on each side. Therefore, the thickness S is equal to (t+2×h). The tooth portions 92 are formed by a press work, which is effected on the friction mounting portion 91 to increase the thickness by h on each side, as will be described later. As seen in FIG. 7, the thickness S of the tooth portion 92 is smaller than a thickness T of the second friction plate 51 at the position in which the friction mounting portion 91 and the friction facings 51a are coupled together. The friction facings 51a are joined to the opposite side surfaces of the portion 91, respectively.

As shown in FIG. 5, the tooth portions 92 are circumferentially spaced from each other by a predetermined distance. In other words, the portions between the neighboring tooth portions 92 do not have the thickness S. In the core plate 90, the neighboring tooth portions 92 are connected together by the friction mounting portion 91. The inner peripheral surface of each portion of the core plate between the tooth portions 92 is formed of the inner peripheral surface 91b of the friction mounting portion 91. Accordingly, as seen in FIG. 4, the lubricating oil which flows radially outward through the oil apertures 82 as described above flows through the space between the two second friction plates 51. Referring to FIG. 5, the lubricating oil also flows through portions between the neighboring tooth portions 92 on the sides of the inner peripheral surfaces 91b. Thus, now referring to FIG. 4, the lubricating oil flows efficiently on the surfaces of the first and second friction plates 50 and 51.

As shown in FIGS. 5 and 7, in the core plate 90, the tooth surface 92a and the tooth top surface 92b have the width W, which is determined to be equal to or larger than the foregoing size h. Thus, the tooth portions 92 of the core plate 90 are configured to establish the relationship of W≦h.

Figure 12:
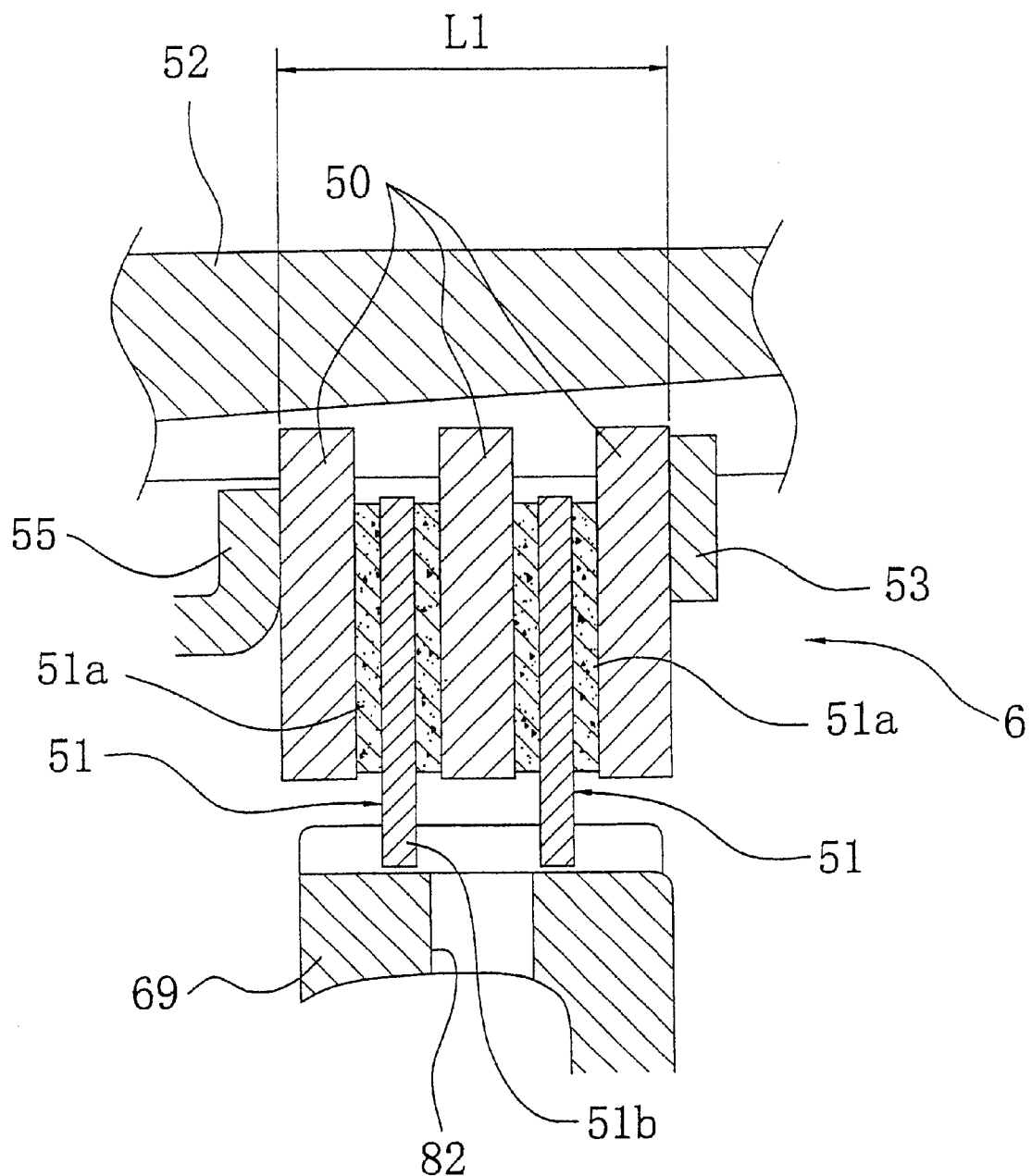
FIG. 12 is a partial cross-sectional view of a conventional prior art multi-disk clutch.

Since the core plate 90 has the foregoing form, the multi-disk clutch 6 of this embodiment has the following advantages. As seen in FIGS. 4 and 7, the thickness t of the friction mounting portion 91, supports the friction facings 51 joined thereto. As best seen in FIG. 4, the thickness t of the facing portion 91 is kept small to minimize the overall thickness L2 of the multi-disk clutch 6. Referring FIGS. 4 and 5, however, the tooth portion 92 affecting the torque transmission capacity still has the large thickness S. Therefore, the required torque transmission capacity is ensured. Accordingly, Further the overall thickness of the multi-disk clutch 6 shown in FIG. 4, can be smaller than that of the conventional multi-disk clutch shown in FIG. 12 (L2<L1). Thereby, the transmission including the multi-disk clutch 6 can have comparatively reduced sizes. Moreover, since the core plate 90 has the T-shaped section, the thickness S of the tooth portion 92 can be easily increased.

Preferred methods of manufacturing the core plate 90 will now be described with reference to FIGS. 8a–10d. The core plate 90 is preferably formed of a one-piece, unitary member from a sheet material. The core plate 90 can be prepared by performing manufacturing steps such as stamping and cutting on a disk-shaped material having a uniform thickness. Three examples of the manufacturing method will now be described below.

Figure 8A:
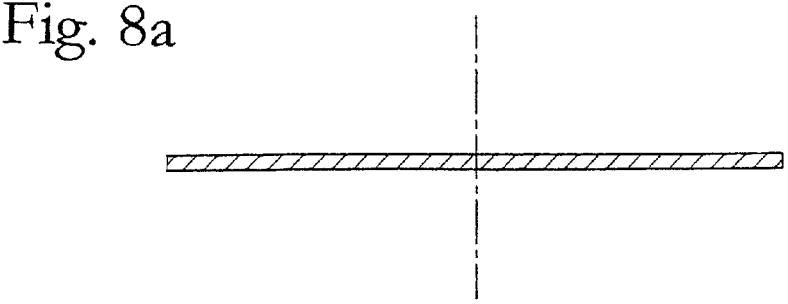
FIG. 8a is a transverse cross-sectional view a blank plate used to form the core plate shown in FIGS. 4–6 in accordance with a first method the present invention.

Referring to FIGS. 5 and 8a–8d, the first method of manufacturing the core plate 90 will now be described. First, as shown in FIG. 8a, the sheet material is provided with a uniform thickness t that is substantially equal to the final thickness t of the friction mounting portion 91 of the core plate 90 to be produced. The sheet material can initially be made as a circular plate or disk-shaped member that has a diameter that is substantially equal to the final diameter of the core plate 90 to be produced. Alternatively, the outer diameter of the core plate 90 can be formed by cutting a large piece of sheet material to the final diameter of the core plate 90 at any time during the manufacturing process.

Figure 8B:
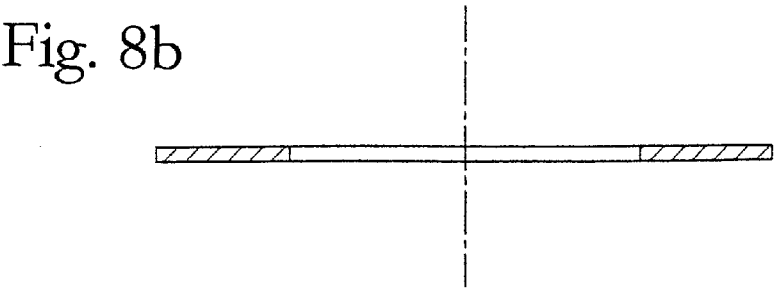
FIG. 8b is a simplified transverse cross-sectional view an intermediate form of the plate illustrated in FIG. 8a after the center portion has been punched or cut out according to the first method of forming the core plate shown in FIGS. 4–6 according to the present invention.

As seen in FIG. 8b, a central portion is now preferably removed from the sheet material to form a central opening. This central portion can be removed by cutting in one or more steps. For example, the central opening can first be cut to form a circular hole with a diameter smaller than the final inner diameter of the core plate 90. Next, the central opening can be further cut or punched out to form the rough outline for the internal tooth portions 92 (not shown in FIGS. 8b–8d due to the difficulties in drawing such teeth). Alternatively, the internal tooth portions 92 can be formed later on such as during or after the steps of FIGS. 8c and 8d, or they can be made simultaneously in one cutting or punching operation with the large central opening shown in FIG. 8b. This annular disk-shaped material has a planar area larger than the final planar area of the finally produced core plate 90.

Figure 8C:
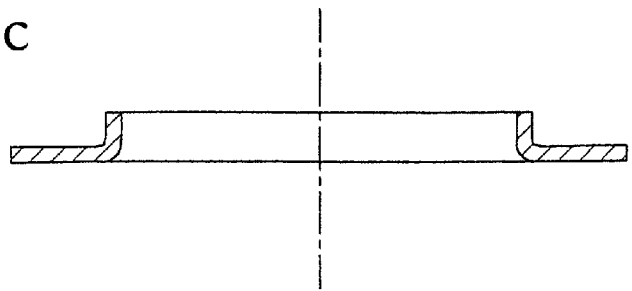
FIG. 8c is a simplified transverse cross-sectional view another intermediate form of the plate illustrated in FIGS. 8a and 8b after the center portion has been deformed according to the first method of forming the core plate shown in FIGS. 4–6 according to the present invention.

Press work is now performed on the annular disk-shaped material to bend the radially inner portion to form a plurality of bent portions (assuming the rough outline of the tooth portions 29 has already been made). These bent portions will form the tooth portions 92. In other words, the sheet material is stamped or otherwise deformed to form axial offset bent portions that are located on one axial side of the sheet material. Thus, the disk-shaped material now has a cross-section as shown in FIG. 8c, with the spaces between the bent portions not being shown in FIGS. 8c or 8d for simplicity. Thus, in FIG. 8c a core plate is formed that corresponds to core plate 190 of FIG. 11.

Figure 8D:
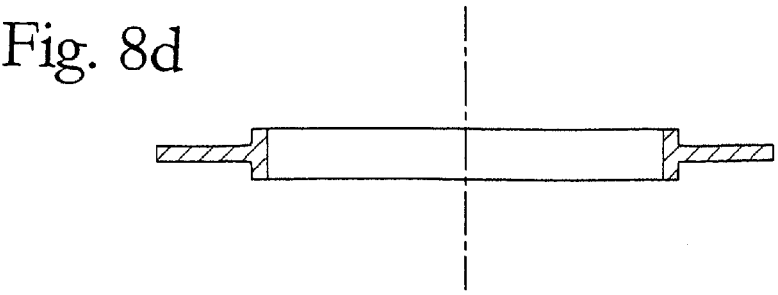
FIG. 8d is a simplified transverse cross-sectional view the final form of the plate illustrated in FIGS. 8a–8c after the center portion has been further deformed according to the first method of forming the core plate shown in FIGS. 4–6 according to the present invention.

Finally, additional press work is performed on the bent portions which will form the final shape of the tooth portions 92, so that the core plate 90 will have the cross-section shown in FIG. 8d with the individual tooth portions 92 not being shown for simplicity. In the last press work, each tooth portion 92 receives a compression force which is substantially perpendicular to the direction of its thickness. Thus, the form of the tooth portion 92, which is complementary in shape to the dies of a press machine, is performed to form the core plate 90 as shown in FIG. 5.

Figure 9A:
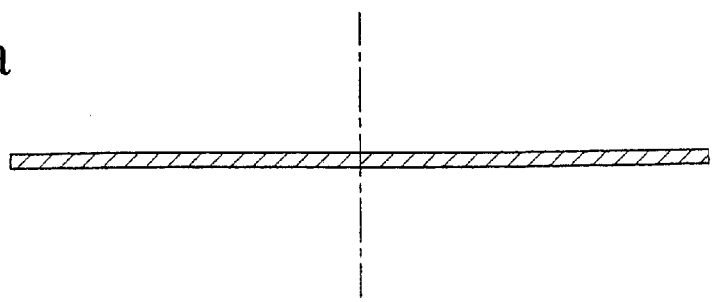
FIG. 9a is a transverse cross-sectional view a blank plate used to form the core plate shown in FIGS. 4–6 in accordance with a second method the present invention.

A second method will now be described with reference to FIGS. 5 and 9a–9d. First, as shown in FIG. 9a, sheet material is provided with a uniform thickness t that is substantially equal to the final thickness t of the friction mounting portion 91 of the core plate 90 to be produced. The sheet material can be initially formed as a circular plate or a disk-shaped member that has an outer diameter that is substantially equal to the final diameter of the core plate 90 to be produced. Alternatively, the outer diameter of the core plate 90 can be formed by cutting a large piece of sheet material to the final diameter of the core plate 90 at any time during the manufacturing process.

Figure 9B:
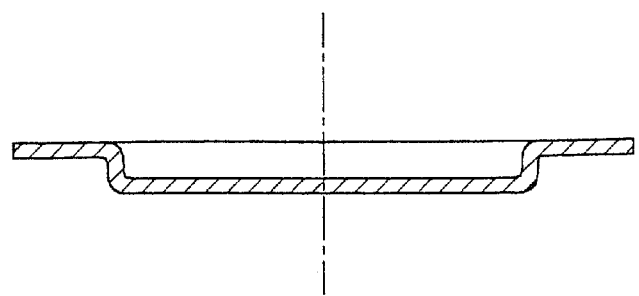
FIG. 9b is a transverse cross-sectional view an intermediate form of the plate illustrated in FIG. 9a after the center portion has been deformed according to the second method of forming the core plate shown in FIGS. 4–6 according to the present invention.

Next, press work is effected to change the sheet material into a hat-shaped form as shown in FIG. 9b. In other words, the sheet material is stamped or otherwise deformed to form an axial offset portion that is located on one axial side of the sheet material.

Figure 9C:
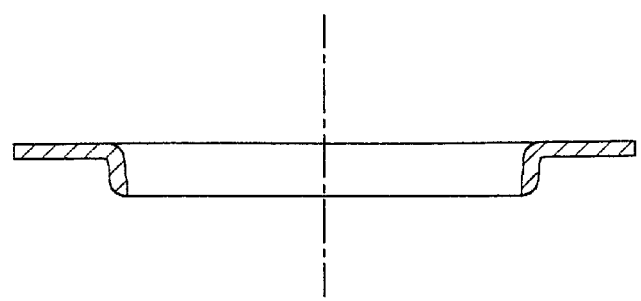
FIG. 9c is a simplified transverse cross-sectional view another intermediate form of the plate illustrated in FIGS. 9a and 9b after the center portion has been punched or cut out according to the second method of forming the core plate shown in FIGS. 4–6 according to the present invention.

As seen in FIG. 9c, a central portion is now preferably removed from the sheet material to form a central opening.

The central opening can first be a circular hole with a diameter that is substantially the same as the final inner diameter of the core plate 90 to be formed. Thus, the sheet material has an annular L-shaped form as shown in FIG. 9c. Next, the stepped portion is cut or punched to form the rough outline of the internal tooth portions 92 (not shown in FIGS. 9c and 9d due to difficulties in drawing such teeth). Alternatively, the internal tooth portions 92 can be formed later, such as during or after the steps shown in FIGS. 9c or 9d, or the internal tooth portions 92 can be made simultaneously in one cutting or punching operation with the central opening shown in FIG. 9c. This annular material has a planar area substantially equal to that of the final planar area of the finally produced core plate 90. Thus, in FIG. 9c a core plate is formed that basically corresponds to FIG. 11.

Figure 9D:
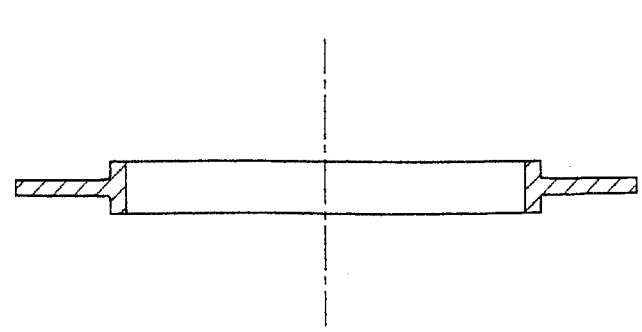
FIG. 9d is a simplified transverse cross-sectional view the final form of the plate illustrated in FIGS. 9a–9c after the center portion has been further deformed according to the second method of forming the core plate shown in FIGS. 4–6 according to the present invention.

If additional press work is successively performed on the portions of the sheet material which will form the tooth portions 92, the core plate 90 will now have a cross-section as shown in FIG. 9d, with individual tooth portions 92 not shown for simplicity. In the last press work, each tooth portion 92 receives a compression force which is substantially perpendicular to the direction of its thickness. Thus, the form of the tooth portions 92, which are complementary in shape to the dies of the press machine, is performed to form the core plate 90, as shown in FIG. 5.

Figure 10A:
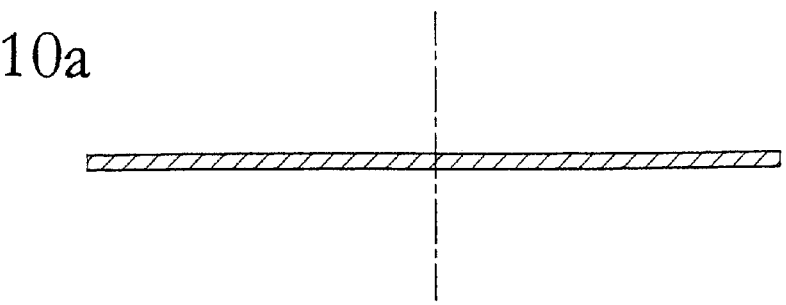
FIG. 10a is a transverse cross-sectional view a blank plate used to form the core plate shown in FIGS. 4–6 in accordance with a third method the present invention.

A third method will now be described with reference to FIGS. 5 and 10a–10d. As shown in FIG. 10a, a sheet material is provided with a uniform thickness that is substantially equal to the final thickness t of the friction mounting portion 91 of the core plate 90 to be produced. The sheet material can be initially formed as a circular plate or a disk-shaped member that has an outer diameter that is substantially equal to the final diameter of the core plate 90 to be produced. Alternatively, the outer diameter of the core plate 90 can be formed by cutting a large piece of sheet material to the final diameter of the core plate 90 at any time during the manufacturing process.

Figure 10B:
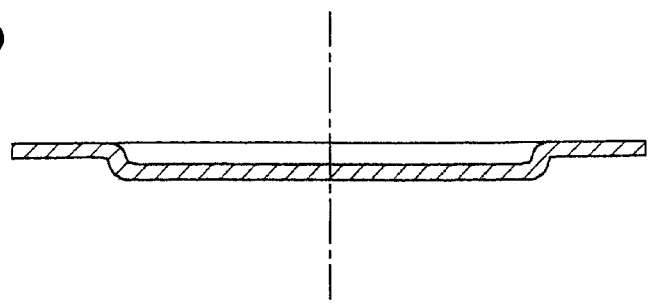
FIG. 10b is a transverse cross-sectional view an intermediate form of the plate illustrated in FIG. 10a after the center portion has been deformed according to the third method of forming the core plate shown in FIGS. 4–6 according to the present invention.

Press work is then performed to change the sheet material into a hat-shaped form as shown in FIG. 10b. In other words, the sheet material is stamped or otherwise deformed to form axial offset portion that is located on one axial side of the sheet material.

Figure 10C:
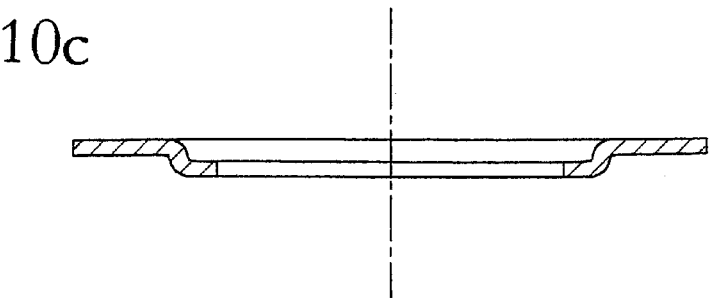
FIG. 10c is a simplified transverse cross-sectional view another intermediate form of the plate illustrated in FIGS. 10a and 10b after the center portion has been punched or cut out according to the third method of forming the core plate shown in FIGS. 4–6 according to the present invention.

A central portion is now preferably removed from the sheet material by cutting in one or more steps. The central opening is cut or punched out to form the rough outline for the internal tooth portions 92 (not shown in FIGS. 10c and 10d due to the difficulties in drawing such teeth). The cutouts forming the internal tooth portions 92 extend across the bend that formed the axial offset portion of the sheet material. The cutting of the central opening can be done in one or more steps. For example, a circular hole with an inner diameter smaller than the final inner diameter of the core plate 90 can first be formed as shown in FIG. 10c. Next, the central opening can be further cut or punched out to form the rough outline for the internal tooth portions 92 (not shown in FIGS. 10c or 10d due to the difficulties in drawing such teeth). Alternatively, the internal tooth portions 92 can be formed later such as during or after the steps of FIGS. 10c and 10d, or they can be made simultaneously in one cutting or punching operation with the large central opening shown in FIG. 10c. This annular material has a planar area larger than the final planar area of the finally produced core plate 90. The sheet material now has a cross-section shown in FIG. 10c, with the spaces between bent portions not being shown in FIGS. 10c or 10d for simplicity. In the method, the axially offset portion or portions have an axially extending section and a radially extending section.

Figure 10D:
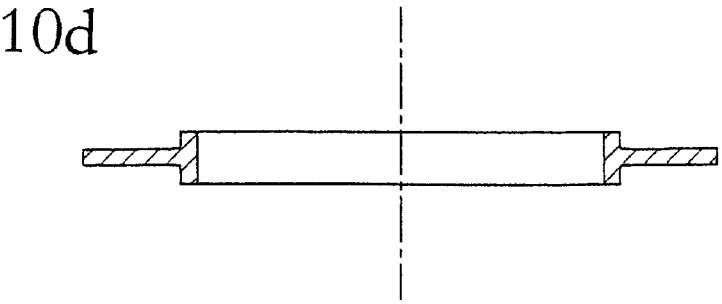
FIG. 10d is a simplified transverse cross-sectional view the final form of the plate illustrated in FIGS. 10a–10c after the center portion has been further deformed according to the third method of forming the core plate shown in FIGS. 4–6 according to the present invention.

Finally, additional press work is performed on the bent portions which will form the final shape of the tooth portions 92, so that the core plate 90 will have the cross-section shown in FIG. 10d with the individual tooth portions 92 not being shown for simplicity. In the last press work, each tooth portion 92 receives a compression force which is substantially perpendicular to the direction of its thickness. Thus, the form of the tooth portion 92, which is complementary in shape to the dies of a press machine, is performed to form the core plate 90 as shown in FIG. 5.

Alternate Embodiment

Figure 11:
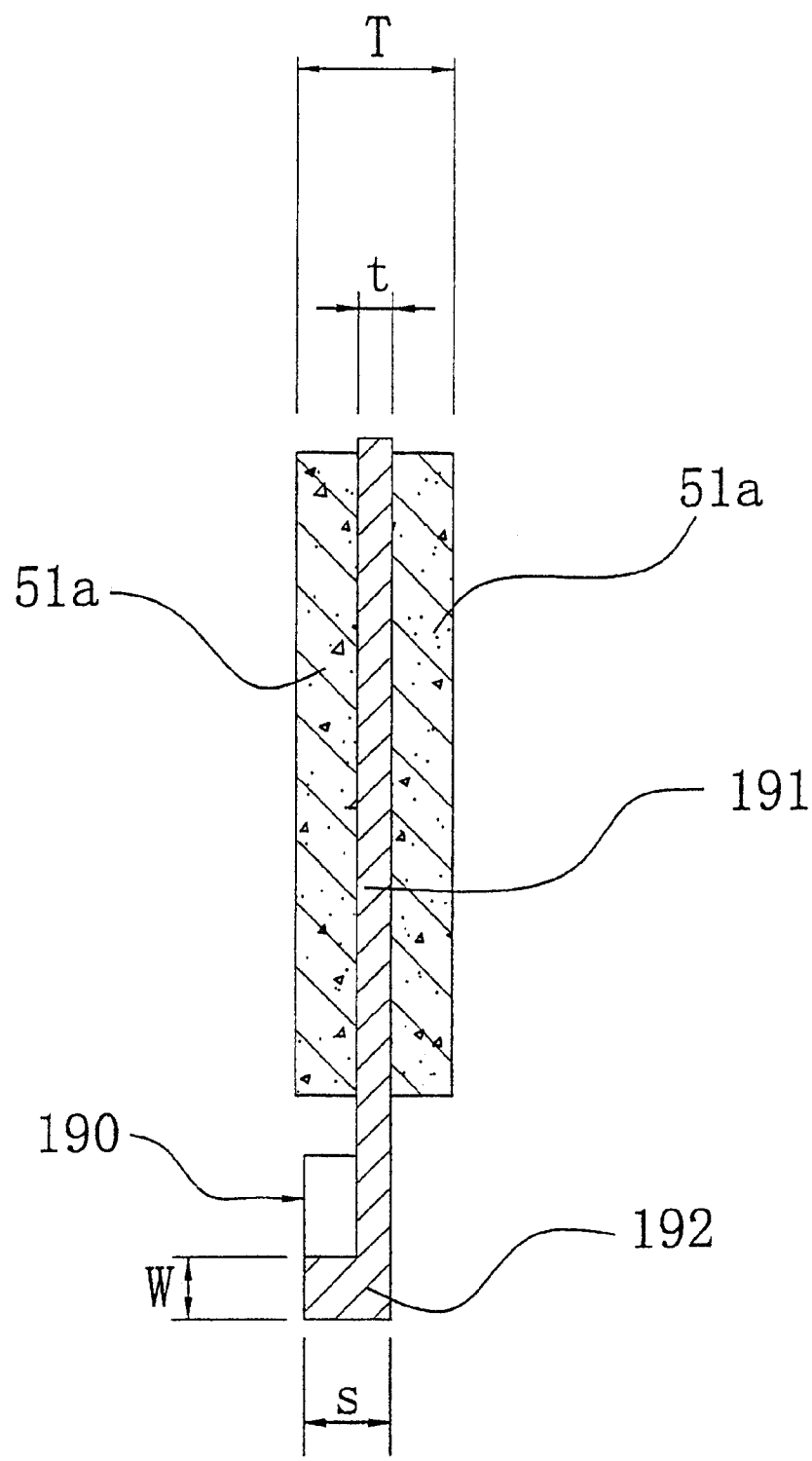
FIG. 11 is a partial cross-sectional view of a second friction plate similar to FIG. 7 but showing a core plate in accordance with another embodiment of the present invention.

As shown in FIG. 11, a core plate 190 having a L-shaped section can be employed instead of the core plate 90 of the T-shaped section for each of the second friction plates 51 which are used as a component of the multi-disk clutch 6 of the foregoing embodiment. Even in the structure employing the core plate 190, it is possible to reduce effectively the thickness t of the friction mounting portion 191. The core plate 190 has tooth portions 192 each projected only beyond one side surface of a friction mounting portion 191 and thus has the L-shaped section. The friction mounting portion 191 is joined to the friction facings 51a. Thus, the friction mounting portion 191 is liable to increase the total thickness of the multi-disk clutch 6. Simultaneously, it is possible to increase the thickness S of the toothed portions 192 affecting the torque transmission capacity.

In the above embodiment employing the L-shaped section, the thickness S of the tooth portion 192 may be slightly shorter than that of the T-shaped section, but the core plate 190 can be formed more easily. According to the present invention, the friction mounting portion supports the friction member joined thereto. The friction mounting portion is liable to increase the total thickness of the multi-disk clutch. Thus, the friction mounting portion has a reduced thickness. The coupling portion which is not joined to the friction member has an increased thickness. Therefore, the portion (friction mounting portion) of the core plate supporting the friction member can have a smaller thickness than that in the prior art without reducing the torque transmission capacity of the coupling portion. Thereby, the total thickness of the multi-disk clutch can be reduced, and the device using the multi-disk clutch can be reduced in size.

The terms of degree such as "substantially", "about" and "approximately" as used herein mean a reasonable amount of deviation of the modified term such that the end result is not significantly changed. These terms should be construed as including a deviation of ±25% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A multi-disk clutch for transmitting and interrupting a torque comprising:
    first and second rotatable members rotatable around an axis of rotation;
    a plurality of first plates circumferentially non-rotatably coupled to said first rotatable member, but axially movable relative to said first rotatable member; and a plurality of second plates circumferentially non-rotatably coupled to said second rotatable member, but axially movable relative to said second rotatable member, each of said second plates including a core plate with a coupling portion and a friction mounting portion having a friction member, said friction mounting portion being opposed to an adjacent one of said first plates, each of said coupling portions of said core plates being circumferentially coupled to said second rotatable member, said friction member being joined to said friction mounting portion, said coupling portion comprising tooth surfaces configured to extend in a first direction from said friction mounting portion toward said axis of rotation, and tooth top surfaces configured to connect in a second direction said tooth surfaces, said tooth surfaces having a first width extending perpendicular to said first direction, said tooth top surfaces having a second width extending substantially perpendicular to said axis of rotation, said first width and said second width being substantially equal, each of said friction mounting portions of each of said core plates having a thickness smaller than a thickness of each of said coupling portions of each of said core plates, said each of said friction mounting portions being configured to extend to said first width and said second width.

2. The multi-disk clutch according to claim 1, wherein each of said coupling portions of each of said core plates has teeth that engage teeth of said second rotatable member such that said coupling portions of said core plates and the second rotatable member are coupled together by teeth meshing.

3. The multi-disk clutch according to claim 1, wherein each of said coupling portions of each of said core plates includes an internally-toothed wheel that engages teeth of said second rotatable member.

4. The multi-disk clutch according to claim 3, wherein each of said coupling portions of each of said core plates projects outwardly beyond one side surface of said friction mounting portions of said core plates such that cross sections of said core plates are L-shaped.

5. The multi-disk clutch according to claim 3, wherein said friction members are joined to opposite side surfaces of said friction mounting portions of said core plates; and each of said coupling portions of each of said core plates projects outwardly beyond said opposite side surfaces of said friction mounting portions such that cross sections of said core plates are T-shaped.

6. The multi-disk clutch according to claim 2, wherein each of said coupling portions of each of said core plates projects outwardly beyond one side surface of said friction mounting portions of said core plates such that cross sections of said core plates are L-shaped.

7. The multi-disk clutch according to claim 2, wherein said friction members are joined to an opposite side surfaces of said friction mounting portions of said core plates; and each of said coupling portions of each of said core plates projects outwardly beyond opposite side surfaces of said friction mounting portions such that cross sections of said core plates are T-shaped.

8. The multi-disk clutch according to claim 1, wherein each of said coupling portions of each of said core plates projects outwardly beyond one side surface of said friction mounting portions of said core plates such that cross sections of said core plates are L-shaped.

9. The multi-disk clutch according to claim 1, wherein said friction members are joined to an opposite side surfaces of said friction mounting portions of said core plates; and each of said coupling portions of each of said core plates projects outwardly beyond opposite side surfaces of said friction mounting portions such that cross sections of said core plates are T-shaped.

10. The multi-disk clutch according to claim 1, further comprising a movable pressure plate arranged to press said first and second friction plates together; and a return spring arranged to bias said pressure plate away from said first and second friction plates.

11. The multi-disk clutch according to claim 10, wherein each of said coupling portions of each of said core plates has teeth that engage teeth of said second rotatable member such that said coupling portions of said core plates and the second rotatable member are coupled together by teeth meshing.

12. The multi-disk clutch according to claim 11, wherein each of said coupling portions of each of said core plates projects outwardly beyond one side surface of said friction mounting portions of said core plates such that cross sections of said core plates are L-shaped.

13. The multi-disk clutch according to claim 11, wherein said friction members are joined to opposite side surfaces of said friction mounting portions of said core plates; and each of said coupling portions of each of said core plates projects outwardly beyond said opposite side surfaces of said friction mounting portions such that cross sections of said core plates are T-shaped.

14. The multi-disk clutch according to claim 10, wherein each of said coupling portions of each of said core plates includes an internally-toothed wheel that engages teeth of said second rotatable member.

15. The multi-disk clutch according to claim 14, wherein each of said coupling portions of each of said core plates projects outwardly beyond one side surface of said friction mounting portions of said core plates such that cross sections of said core plates are L-shaped.

16. The multi-disk clutch according to claim 14, wherein said friction members are joined to opposite side surfaces of said friction mounting portions of said core plates; and each of said coupling portions of each of said core plates projects outwardly beyond said opposite side surfaces of said friction mounting portions such that cross sections of said core plates are T-shaped.

17. The multi-disk clutch according to claim 2, wherein said coupling portions of said core plates have a larger thickness than said friction mounting portions at least at a tooth surface portion of said teeth of said coupling portions which are adapted to contact said teeth of one of said rotatable members.

18. A friction plate for a multi-disk clutch that transmits and interrupts torque between first and second rotatable members having an axis of rotation, said friction plate comprising:

a pair of friction facing portions; and a core plate including a coupling portion and a friction mounting portion with said friction facing portions being coupled to opposite sides of said friction mounting portion of said core plate, said coupling portion comprising tooth surfaces configured to extend in a first direction from said friction mounting portion toward the axis of rotation, and tooth top surfaces configured to connect in a second direction said tooth surfaces, said tooth surfaces having a first width extending perpendicular to said first direction, said tooth top surfaces having a second width extending substantially perpendicular to said axis of rotation, said first width and said second width being substantially equal, said friction mounting portion of said core plate having a thickness smaller than a thickness of said coupling portion of said core plate that is adapted to engage one of said first and second rotatable members, said friction mounting portion being configured to extend to said first width and said second width.

19. The friction plate according to claim 18, wherein said coupling portion of said core plate has teeth that are adapted to engage teeth of one of the rotatable members.

20. The friction plate according to claim 19, wherein said teeth of said coupling portion of said core plate form an internally-toothed wheel.

21. The friction plate according to claim 20, wherein said coupling portion of said core plate has a larger thickness than said friction mounting portion at least at a tooth surface portion of said teeth of said coupling portion which is adapted to contact a tooth of one of the rotatable members.

22. The friction plate according to claim 20, wherein said coupling portion of said core plate projects outwardly beyond one side surface of said friction mounting portion of said core plate such that a cross section of said core plate is L-shaped.

23. The friction plate according to claim 20, wherein said friction members are joined to opposite side surfaces of said friction mounting portion of said core plate; and said coupling portion of said core plate projects outwardly beyond said opposite side surfaces of said friction mounting portion such that a cross section of said core plate is T-shaped.

24. The friction plate according to claim 19, wherein said coupling portion of said core plate has a larger thickness than said friction mounting portion at least at a tooth surface portion of said teeth of said coupling portion which is adapted to contact a tooth of one of the rotatable members.

25. The friction plate according to claim 19, wherein said coupling portion of said core plate projects outwardly beyond one side surface of said friction mounting portion of said core plate such that a cross section of said core plate is L-shaped.

26. The friction plate according to claim 19, wherein said friction members are joined to opposite side surfaces of said friction mounting portion of said core plate; and said coupling portion of said core plate projects outwardly beyond said opposite side surfaces of said friction mounting portion such that a cross section of said core plate is T-shaped.

27. The friction plate according to claim 18, wherein said coupling portion of said core plate projects outwardly beyond one side surface of said friction mounting portion of said core plate, such that a cross section of said core plate is L-shaped.

28. The friction plate according to claim 18, wherein said coupling portion of said core plate projects outwardly beyond said opposite side surfaces of said friction mounting portion such that a cross section of said core plate is T-shaped.

29. A multi-disk clutch for transmitting and interrupting a torque comprising:

first and second rotatable members rotatable around an axis of rotation;

a plurality of first plates circumferentially non-rotatably coupled to said first rotatable member, but axially movable relative to said first rotatable member; and a plurality of second plates circumferentially non-rotatably coupled to said second rotatable member, but axially movable relative to said second rotatable member, each of said second plates including a core plate with a plurality of coupling portions and a friction mounting portion having a friction member, said core plate having a toric shape formed with an aperture having an inner circumference, each of said plurality of coupling portions extending from said inner circumference in said aperture, each of said plurality of coupling portions configured to be connected to another by an inner peripheral surface of said friction mounting portion, said inner peripheral surface configured to be coincident with said inner circumference, said friction mounting portion being opposed to an adjacent one of said first plates, each of said coupling portions of said core plates being circumferentially coupled to said second rotatable member, said friction member being joined to said friction mounting portion, each of said friction mounting portions of each of said core plates having a thickness smaller than a thickness of each of said coupling portions of each of said core plates.

* * * * *